Figure 21:
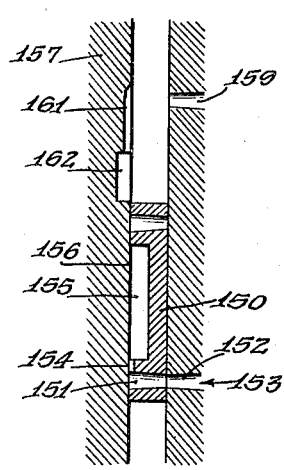
Figure 22:
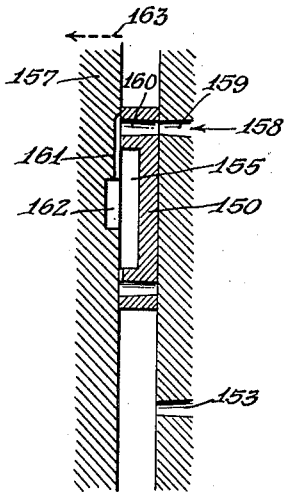

Dec. 24, 1940.  L. NAST  2,226,408
APPARATUS FOR MANUFACTURING COMPOUND MOLDED BODIES
Filed Feb. 27, 1937  3 Sheets-Sheet 1
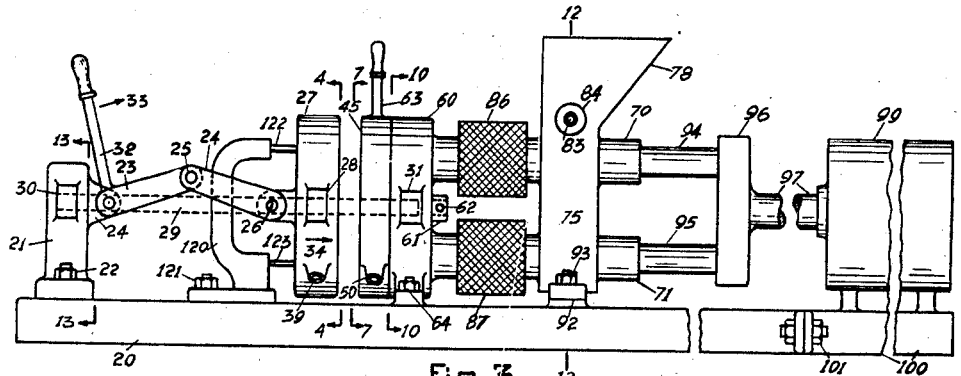
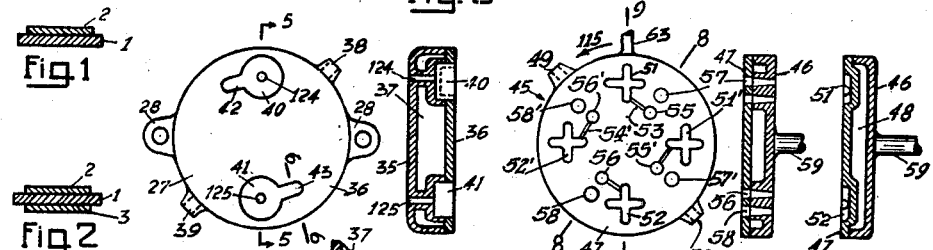
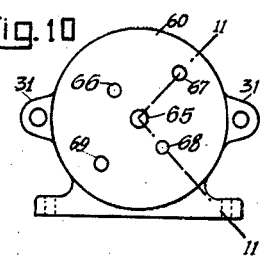
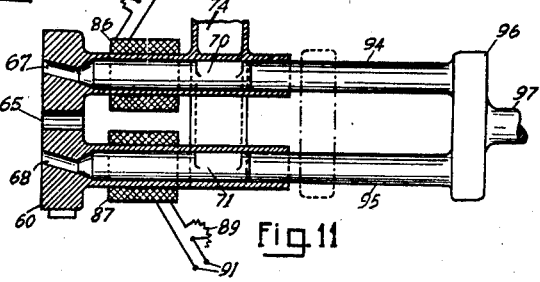
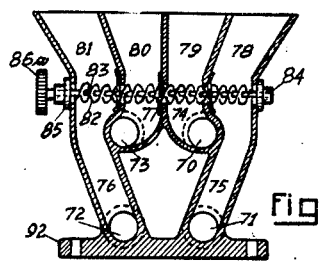
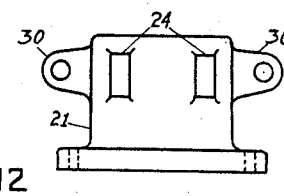
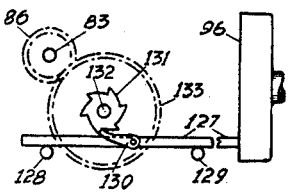
Inventor
Leo Nast
BY
J. Oppenheimer
Attorney

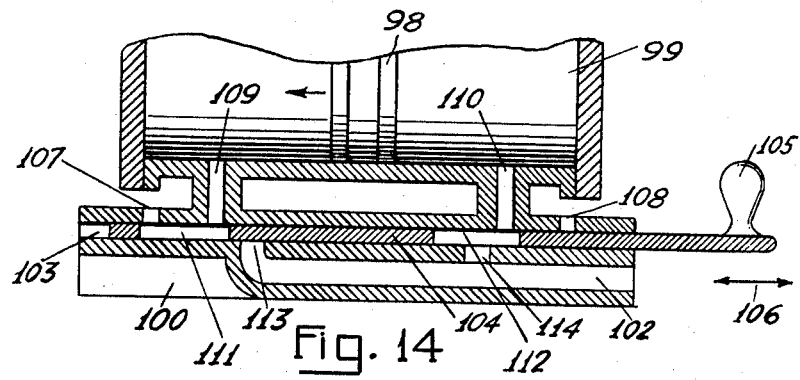
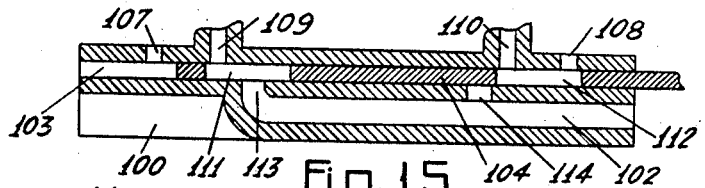
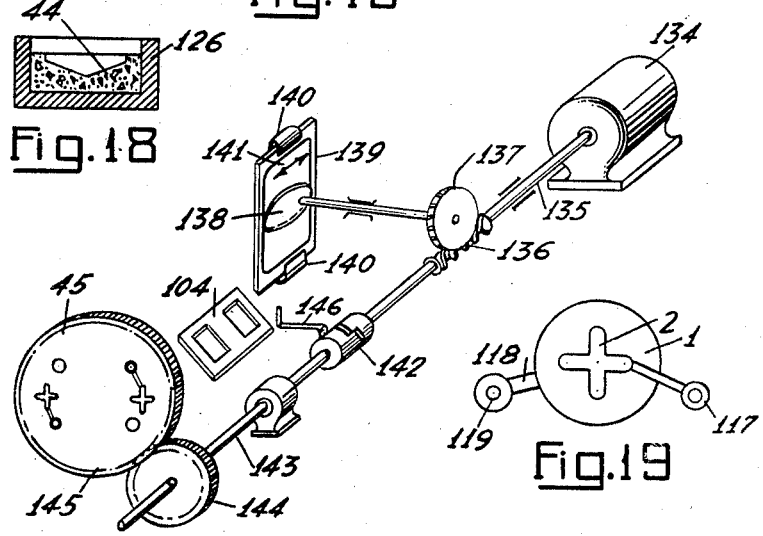

Dec. 24, 1940.   L. NAST   2,226,408
APPARATUS FOR MANUFACTURING COMPOUND MOLDED BODIES
Filed Feb. 27, 1937   3 Sheets-Sheet 3

INVENTOR.
Leo Nast
BY
ATTORNEY.

Patented Dec. 24, 1940

2,226,408

UNITED STATES PATENT OFFICE 2,226,408

APPARATUS FOR MANUFACTURING COMPOUND MOLDED BODIES

Leo Nast, Plainfield, N. J., assignor to New Brunswick Die Molding Corporation, New Brunswick, N. J.

Application February 27, 1937, Serial No. 128,191
In Switzerland July 21, 1936

4 Claims. (Cl. 18—30)

This invention relates to a machine or apparatus for manufacturing compound molded bodies of moldable material, and in particular, to a combination mold for manufacturing such compound bodies.

It is an object of the invention to increase the efficiency of the manufacture of compound molded bodies, and of the machines and apparatuses used therefor.

It is another object of the invention to increase the output obtainable by such machines.

It is another object of the invention to make molded bodies composed of at least two parts of the same or of different qualities of moldable material in a more simple and efficient manner than known heretofore. In particular, it is an object of the invention to make and use a machine, or combination mold thereof, enabling the manufacture of such compound bodies step by step in a continuous process, and without using any foreign binding medium for connecting the parts of the composite body.

It is another object of the invention to manufacture compound bodies consisting of at least two parts of the same or different quality moldable material in a continuous process and without using any foreign binding medium for connecting said parts. In particular the invention contemplates a machine, or combination mold thereof, having at least two working stations in which the different parts of the compound body to be manufactured are made and at least in one of them immediately connected.

It is another object of the invention to manufacture bodies of moldable material in sizes exceeding those which could be manufactured heretofore in a continuous process without interconnecting several parts in a separate manufacturing step and/or using a binding medium. In particular, the invention contemplates a machine, or combination mold thereof, making possible the manufacture of bodies of moldable material comprising several parts compounded into a unit without any additional compounding step, the size of such compound body exceeding, if desired, that of bodies of moldable material manufactured heretofore without employing separate compounding steps.

It is another object of the invention to manufacture parts of two or more compound bodies of moldable material and to finish the latter ones simultaneously, and in particular in the same machine, or its combination mold, thereby increasing economy and output of the manufacturing process and of the machine, or its combination mold.

These and other objects of the invention will be more readily realized when the description proceeds with reference to the drawings.

In the drawings

Figs. 1 and 2 show cross-sections through compound bodies comprising two and three parts, respectively;

Fig. 3 a side elevation of a machine adapted for the performance of the method according to this invention;

Fig. 4 a front elevation along the line and seen in the direction of arrows 4—4 in Fig. 3;

Fig. 5 a cross-section along the line 5—5 in Fig. 4;

Fig. 6 a part of a cross-section along the line 6—6 in Fig. 4;

Fig. 7 a front elevation along the lines and seen in the direction of the arrows 7—7 in Fig. 3;

Fig. 8 a cross-section along the line 8—8 in Fig. 7;

Fig. 9 a cross-section along the line 9—9 in Fig. 7;

Fig. 10 a front elevation along the line and seen in the direction of the arrows 10—10 in Fig. 3.

Fig. 11 a cross-section with some parts broken away, along the line 11—11 in Fig. 10;

Fig. 12 a cross-section along the line 12—12 in Fig. 3;

Fig. 13 a front elevation along the line and seen in the direction of the arrows 13—13 in Fig. 3;

Figs. 14 and 15 a cross-section through the lower part of the drive of the machine by air under pressure, shown in different positions;

Fig. 16 a detail of the drive of a moldable material feeding device;

Fig. 17 more diagrammatically and in perspective an automatic drive of the various parts of the machine;

Fig. 18 is a particular mold cavity;

Fig. 19 a front view, and

Fig. 20 a side view of a compound body as derived from a mold.

Figs. 21-24 show schematically two features of my invention.

It is to be understood that the drawings only show a machine with its details for illustrative purposes by way of example, and that the invention is not limited thereto, but is to be understood in its broadest aspect from the appended claims.

It is further to be understood that moldable material according to the invention comprises any substantially organic material which is solid at room or slightly elevated temperatures, but becomes soft, pliable and plastic at more elevated temperature depending upon the composition of the material. At such elevated temperature the material may be shaped and molded in any desired way and it keeps this shape when permitted or caused to cool down to a temperature at which the material solidifies. Moldable masses of such type are for instance acetyl acetates, preferably cellulose acetates, but it is understood that the invention is not limited to the employment of this type of material.

By the invention compound bodies of two or more parts can be obtained. The parts of which the final body is made can consist of one kind or of different kinds of moldable material. If different kinds of moldable material are used, their basic composition may be identical, but for instance their color may be different, or their basic composition may be different and their color identical, or both the color and the basic compositions may be different. As far as the compositions are concerned, they may be identical in every respect, or for instance differ in that one composition does not contain a filler, while the other one comprises some added filling material which may for instance be metal powder, powder of electrically or thermically insulating material, or any other desired condition.

Referring to the drawings, Fig. 1, the parts 1 and 2 forming a compound body may be of the same or different color, and of the same or different shape and size, and of the same composition of moldable material or of different compositions. Similarly in Fig. 2, the parts 1, 2 and 3 forming a desired compound body may be of the same or different color, shape and size, and in particular the parts 2 and 3 may be of the same and part 1 of a different color, shape and size. Furthermore, the composition of the moldable material forming parts 1, 2, 3 may be identical, or one or the other parts 1, 2, or all parts 1, 2, 3 may consist of different compositions of moldable material.

According to the process of this invention the parts of the compound body are manufactured by an injection or extrusion process, i. e. any process of pressing moldable material in its plastic state at suitably elevated temperature into a desired mold wherein it is allowed or caused to cool down to the temperature at which it solidifies. Preferably the plastic material is held in the mold under pressure until it solidifies.

According to the process of the invention a compound body as shown in Fig. 1 is manufactured in such a way that first one of the two parts 1, 2 is made and shaped by injection or extrusion and, after it is almost or completely solidified, the second part is added by injection or extrusion. This second part, necessarily injected in a moldable plastic state, automatically combines with the other part previously made on their common contact surface, although the first part has almost or completely solidified.

Assuming that part 1 is made first and then part 2 is added and simultaneously connected with it, part 1 may suitably be called hereinafter "initial part" and part 2 "supplemental part."

Assuming furthermore that in Fig. 2 part 1 is made first and then parts 2 and 3 added thereto simultaneously or successively and connected thereby with part 1, again part 1 may suitably be called "initial part" and parts 2, 3 "supplemental parts."

It is understood however that part 2 of Fig. 1 may be manufactured first and then form the "initial part," whereas part 1 may be added and simultaneously connected therewith in a subsequent step and therefore called "supplemental part."

Similarly in Fig. 2 for instance parts 2, 3 may be molded first and therefore correctly be called "initial parts," whereas part 1 may be injected between these initial parts and simultaneously be connected with them in a subsequent process step, and in such case part 1 will form a "supplemental part."

By way of example it may be mentioned that the body shown in Figs. 1 and 2 might be a button, or any other kind of trimming. It may also be a jewel or part of it. It may be shaped and made suitable for other uses, such as solid or hollow compound bodies, consisting of moldable material of any desired color, with or without addition of a filler, and it may be electrically conducting or insulating, or resistive against heat or corrosion, as the case may be.

The compound body may be rigid or elastic, and show any other quality desired which can be achieved with moldable material.

It may further be mentioned by way of example that part 1, Figs. 1 and 2, may be of a certain color, e. g. white, whereas parts 2 and 3 are of another color, e. g. red. Furthermore, part 1 may be of opaque or filled material, whereas parts 2, 3 are of transparent material.

It is further understood that a body as shown in Fig. 2 may consist for instance of parts 1, 2 of moldable material, whereas part 3 consists of any other material, such as metal or wood, which is pre-shaped and inserted in the mold before part 1 is injected so that part 1 may adhere to part 3 and combine therewith.

It is understood that the qualities of moldable thermoplastic material to be used, and the variations of its application are not exhausted by the examples given above.

Referring to Fig. 3 there is shown by way of example an assembly of the machine. To a base plate 20 a pillow-block 21 is secured by means of screws 22, as to be seen in the front view of this block in Fig. 13. Lugs 24 are provided thereon to which a pair of links 23 is pivotally connected. Another pair of links 224 is connected at one end by pivots 25 with the links 23, and at its other end by pivots 26 to a body 27 which is shown more in detail in Figs. 4, 5, 6. The body 27 is for instance of cylindrical shape and provided with lugs 28 which slide on bars 29 borne on one end by lugs 30 of the block 21 and by lugs 31 of the body 60 on their other ends.

A handle 32 is rigidly connected with the links 23. By moving this handle in the direction of the arrow 33, the links 23 are turned around the pivot 25 and thereby the links 224 are turned in the opposite direction, whereby these two pairs of links forming a toggle are stretched and the body 27 is moved in the direction of the arrow 34. Inversely, by moving the handle opposite to the direction of the arrow 33, the body 27 is withdrawn in the direction opposite to the arrow 34.

The body 27 forms one part or "outer front member" of a combination mold. It may consist, as shown, of a rear part 35 and a front part 36, forming a hollow body, the cavity 37 of which may contain a suitable cooling medium such as water. The cooling medium may also be passed continuously through the cavity 37 and enter it by the inlet 38 and leave it by the outlet 39. Suitable conduits, such as flexible tubes, or hose, not shown, may be connected with the inlet and outlet, respectively. In the front side 36 any desired number of mold cavities is provided. In the example shown two cavities 40, 41 are provided forming parts of molds for the manufacture of a "supplemental part" as explained above. Each of these cavities may be of any desired shape and size. They may be either of the shape desired to be imparted to the molded body, or capable of receiving exchangeable molds such as shown in Fig. 18, to be inserted therein. Shallow passages 42, 43 are in open connection with the cavities 40, 41, respectively. These passages are preferably of V- or equivalent cross-section as shown at 43 in Fig. 6.

Opposite the body 27 another body 45 is arranged shown in Fig. 7 in front view and in Figs. 8, 9 in different cross-sections, forming another part or "middle form member" of the combination mold. This body also may consist of a rear part 46 and a front part 47, including a hollow space 48 adapted to receive a cooling medium such as water which may for instance enter the hollow space through the inlet 49 and leave it through the outlet 50. The body 45 is provided on its front side with a suitable number of mold cavities, in the example shown with cavities 51, 52, 51', 52' which are connected with preferably shallow and V-shaped influx passages 53, 54, 53', 54', respectively. Channels 55, 56, 55', 56' pass through the body 45 and are connected with the influx passages 53, 54, 53', 54', respectively. Two other pairs of channels 57, 58 and 57', 58', pass through the body 45 in the way shown in Fig. 8.

Cavities 51, 51', 52, 52' may be of the same or of different shape and size inter se and compared to cavities 40, 41, and they may either be formed immediately in the front part 47 itself or by separate exchangeable molds to be inserted into the front part.

The body 45 is provided on its rear side with a pivot pin 59 passing through a body 60 and provided on its outer end for instance with a collar 61 fastened to the pivot pin 59 by means of a bolt 62. A handle 63 provided on the body 45 serves for turning the latter relative to the bodies 60 and 27 into desired positions which may be determined by suitable and adjustable stops not shown in the drawings.

As to be seen from Figs. 3, 10 and 11 a body or "outer feeding member" 60 is mounted for instance by means of screws 64 on the base 20 and provided with a center bore 65 through which the pivot pin 59 passes. There are furthermore provided channels 66, 67, 68, 69 connected with channels and cylinders behind the body 60. Two cylinders 70, 71 are shown in side elevation in Fig. 3 and in cross-sections in Figs. 11, 12; the latter one also shows the other two cylinders 72, 73. At a suitably chosen place of these cylinders feeding channels 74, 75, 76, 77 are connected on the upper ends of which hoppers 78, 79, 80, 81, respectively, are provided. Between the hoppers and the feeding channels a feeding or measuring screw 82 is arranged on a shaft 83 supported on both ends in bearings 84, 85 and provided on one end with a toothed wheel 86.

Screw 82 feeds the desired amount of material out of each hopper into the channels and ultimately into the cylinders.

The moldable material is present in the hoppers in a more or less powdered and solid state. In the hoppers the same or different materials may be present. The amount of material fed by the screw 83 depends upon the working speed of the screw, on its pitch and on the cross-section of the hopper or channel through which the material enters within the reach of the feeding screw. Therefore, by giving to the screw an equal pitch over its entire length, or different pitches in front of the different hoppers, further by properly adjusting the cross-section through which the material enters into the reach of the screw, and lastly by adjusting the speed with which the screw is driven, the individual amounts fed to each of the cylinders can be measured at will. By removing the bearings 84, 85, the screw may be replaced by another one of different structure. The hoppers may also be replaced in order to vary the cross-section through which the material falls into the reach of the screw, and there may be provided any other desired means for regulating and adjusting the amount of material fed by the screw. In particular, there may be provided gates above the screw within the passage from the hopper the adjustment of which controls the cross-section through which the material falls out of the hopper, as is well known in the art.

The amount of material falling upon the feeding screw depends sometimes on its degree of looseness in the hopper, and whether it is sticky. Therefore, well-known jigging means may be provided for keeping the material loose within the hopper making it flow down to the feeding screw easily and uniformly.

It is understood that all such variations in the amount of moldable material fed may be brought about either when the machine stops, or when it is in operation, the latter for instance by changing the speed of the feeding screw or the cross-section of the passage for the material by adjusting a gate.

It is further understood that by the examples given above the possibilities of adjusting the feed are not exhausted, as well-known in the art. In particular, the amount of moldable material to be fed each time into the cylinders or mold may be determined by pressing the material into tablets or pills containing the desired amount, or part of it, and feeding one or more of such tablets into the cylinder or mold. The pills may be of any suitable shape, such as a ball, and be fed into the cylinders step by step by any means wellknown to the art.

Reverting to Figs. 3 and 11, there are shown heating means 86, 87 surrounding parts of the cylinders 70, 71 between the channels 74, 75 and the body 60. The heating means may be of any desired type and arranged in any convenient manner other than shown. In the exemplification of the drawings they are shown as electric heating coils or similar electric heating devices. Electric current is fed from terminals 90, 91 and regulated by resistors 88, 89. Similar heating means are provided for the other cylinders.

The structure containing the channels 74 to 77 and the hoppers 78 to 81 is conveniently secured to the base 20 by means of brackets 92 and screws 93.

In the cylinders 70 to 73, plungers are arranged and secured to a common head 96. Figs. 3 and 11 show only two of these plungers 94 and 95 in the cylinders 70 and 71, whereas the plungers of the cylinders 72, 73 lie behind the plungers 94 and 95. To the head 96 a piston rod 97 is connected to the other end of which a plunger 98 is secured within a cylinder 99 (Figs. 3, 14). Cylinder 99 is mounted preferably on a separate part 100 of the base; the parts 20 and 100 are connected by screws 101. In the part 100 a channel 102 is provided, adapted to be connected with any source of fluid under pressure, such as gas, air or steam, not shown in the drawings. There is further provided a slot 103 in part 100 in which a gate 104 is slidably arranged, provided with a handle 105. The movement of gate 103 can be limited by suitable stops, if desired, not shown in the drawings. Slot 103 communicates through openings 107, 108 with the surrounding atmosphere 109 and by channels 109, 110 with the interior of cylinder 99. Slide 104 is provided with passages 111, 112. Channel 102 is connected by passages 113, 114 with channel 103.

The machine described operates in the following way:

It is assumed that two identical compound bodies are to be manufactured simultaneously although they could be different. It is to be understood that only a single compound body or more than two such bodies may be manufactured simultaneously with the same machine, as it will be more clearly realized when the description further proceeds.

For the sake of simplicity it is further assumed that a compound body consisting of two parts only is to be manufactured. The "initial part" of the compound body is made in the cavities 51, 52, 51', 52' which may be suitably called therefore "initial cavities," whereas the "supplemental parts" of the compound bodies are made in the cavities 40, 41 which therefore are suitably called "supplemental cavities" or molds.

It is also supposed that the initial part forms a cross while the supplemental part forms a circular plate, as shown in Figs. 19, 20. Lastly it is assumed that the crosses are made of a green opaque material, whereas the plates are made of transparent white material.

In operation, the body 45 is turned by means of handle 63 into a working position shown in Fig. 7 wherein channel 57 is in alignment with channel 67 of body 60, Figs. 10, 11, channel 56 is in alignment with channel 69, and channel 55 is in alignment with channel 66. The hoppers 78, 80 are filled with moldable material yielding a body of green and opaque color, whereas the hoppers 79, 81 are filled with a moldable material yielding bodies of white transparent color.

The body 27 is held in a position shown in Fig. 4 by the bars 29. By turning the handle 32 in the direction of the arrow 33, the toggle 23, 224 is stretched and the body 27 moved along the bars 29 and ultimately pressed tightly against the body 45. The bodies 27 and 45 forming parts of a combination mold, it appears that by that movement the combination mold is closed, and the front faces of these bodies shown in Figs. 4 and 7 lie flush against each other. Thereby the front end of channel 57 lies on the left end of influx passage 42, and the front end of channel 58 on the right end of influx passage 43. The openings of the cavities 51, 52 lie in front of the openings of the cavities 40, 41, whereby combined molds 40, 51 and 41, 52 are obtained, whereas the openings of the cavities 51', 52' lie in front of and are closed by flat and full surface portions of the front wall 36 of body 27. Obviously parts of the circular openings of the cavities 40, 41 which lie outside the cross shaped openings of the cavities 51, 52 are closed by surface portions of wall 47.

While the combination mold is closed, or thereafter, the screw 82 is turned with desired speed and for a desired number of turns, and feeds thereby predetermined quantities of powdery moldable material into the cylinders 70 to 73, in front of the plungers which are moved into their outermost position to the right, as shown in Fig. 11.

Incidentally it may be mentioned that the feeding screw must not be operated intermittently, but may work continuously. Then the powdery material is pressed while in the channels 74 to 77 and prevented to enter the cylinders by the plungers driven into the cylinders and closing thereby the outlets from the channels 74 to 77 into the cylinders. Furthermore, by properly timing the injection stroke of the plungers, the amount of moldable material entering the cylinders may also, or additionally be measured, the plungers working like controlling gates of the outlets of the channels 74 to 77.

The current feeding the heating means 86, 87 provided on each cylinder but shown only for two of them, is adjusted by the resistors 88, 89 in such a way that a desired elevated temperature is caused inside the cylinders between the outlets of the channels 74 to 77 and the body 60. The heating means may work continuously and need not be shut off between subsequent injection operations.

In the position of the gate 104 shown in Fig. 14, a pressure fluid can flow through channel 102, passages 114, 112, 110 into the cylinder 99 and drive the plunger 98 in the direction of the arrow. Fluid ahead of the plunger may escape through passages 109, 111, 107. Plunger 98 drives piston rod 97, head 96 and the four plungers connected therewith to the left, Figs. 3, 11. The moldable material fed into the cylinders in front of the plungers in predetermined quantity is thus first driven through the zones heated by the heaters 86, 87 and rendered plastic, i. e. pasty, viscous or even fluid, and then injected, or extruded, through the channels 66 to 69 into the combination mold.

In Fig. 11 there is shown in broken lines the position of the head 96 at the left end of its stroke. It is understood that the length of the stroke may be measured in any desired way, depending upon the amount of material intended to be fed into the combination mold. The plastic material entering the combination mold is cooled therein and ordinarily liable to shrinkage. Therefore it is advisable to avoid rigid stops for the left end of the stroke of the plungers, but to leave them under pressure until after the moldable material is solidified within the combination mold.

The green material of the hoppers 78, 80 is thus pressed through the cylinders 71, 73, therein heated and plasticized and then ejected through the channels 66, 68 (Figs. 10, 11) and 55', 56' into the influx passages 53', 54', and ultimately into the cross shaped mold cavities 51', 52'. The white material supposed to be contained in the hoppers 79, 81 is fed into the cylinders 70, 72, moved through the heating zone therein and plasticized, and thereupon ejected through channels 67, 69 in the body 60, channels 57, 58 of body 45, thereby passing through the latter, into the influx passages 42, 43, and ultimately into the mold cavities 40, 41.

The hot and plastic material received in the cavities is cooled therein within a desired period of time by the cooling medium contained in the cavities 37 and 48. If the material shrinks, the plungers which are still held under pressure feed additional plasticized material into the mold cavities in the way described, and keep them properly filled until after the molded material is solidified.

Thereupon the handle 32 is turned back, the toggle 23, 224 is broken whereby body 27 is withdrawn from body 45, and the combination mold is opened.

At that moment or shortly before the slide 104 is moved into the position shown in Fig. 15 in which air under pressure enters through the passages 102, 113, 111, 109 into cylinder 99, whereas fluid under pressure at that time in the cylinder is allowed to escape through passages 110, 112, 108. Thereby plunger 98 is moved in the direction opposite to the arrow in Fig. 14, and piston rod 97, head 96 and the plungers are withdrawn into their initial position shown for instance in full lines in Fig. 11. As soon as the plunger 98 has arrived in its initial position, the slide 104 is returned into an intermediate position in which the passages 107, 108 are shut, and the plunger 98 brought to rest.

In this way the first operation of the machine is completed with the following result.

The mold cavities 40, 41 received plastic material to form a circular plate 1, as shown in Figs. 1, 19 and 20. In front of the cavities 40, 41 the empty mold cavities 51, 52 were located and consequently filled with white material overflowing from the cavities 40, 41. The body obtained consists therefore of a plate 1 and a cross 2 on it, Figs. 19 and 20, of the same material.

As it will be learned from the subsequent description, only once, when the operation of the machine is first started, such a type of compound body is obtained. Apart from this, plastic material of green color has been injected into the mold cavities 51', 52' which lay in front of and were closed by a flat surface of the front wall 36. Consequently, these cavities have been filled with injected material and a green cross was formed.

While the combination mold is open, the compound white bodies manufactured in this first operation by means of the cavities 40, 41 and 51, 52 are removed, whereas the green crosses in the cavities 51', 52' are left therein. Thereupon body 45 is turned in the direction of the arrow 115, Fig. 7, for instance by a 90° angle. As it is to be understood, however, body 45 may be turned at any other angle relative to the bodies 60 and 27, provided the aims of the invention are achieved thereby. It is further understood that by changes requiring ordinary skill only the body 27 may be turned relative to the body 45 which may be stationary, or both bodies 27 and 45 may be arranged turnable.

By turning body 45 in the way described above, the cavities 51', 52' containing the molded green cross are moved in front of the emptied cavities 40, 41, whereas the emptied cavities 51, 52 arrive in front of and are closed by flat portions of the front wall 36 of body 27. The rear ends of the channels 57', 58' passing through the body 45 are now located in front of the ends of the injector channels 67, 69, whereas the channels 57, 58 terminate in front of full portions of body 60, and are therefore dead. The rear ends of the channels 55, 56 lie opposite the extrusion ends of the injector channels 66, 68 now, whereas channels 55', 56' are dead.

Thereupon handle 32 is turned again in the direction of arrow 33, Fig. 3, and the combination mold is closed. Gate 104, Fig. 14, is moved to the left whereby plunger 98 is again driven to the left in the direction of the arrow in the way described above. A second injection operation as described above is initiated thereby.

Green material is now fed from hoppers 78, 80 into cylinders 71, 73 and injected through channels 68, 66 and 55, 56 respectively, and influx passages 53, 54, ultimately into the cavities 51, 52. The cavities 51, 52 lying in front of flat portions of the wall 36 closing the cavity, green crosses are molded only. They form the "initial part" of the compound body.

White material is fed from hoppers 79, 81 into cylinders 70, 72, therein plasticized and then ejected through channels 67, 69 and 57', 58', passing through body 45, into the influx passages 42, 43, and ultimately the cavities 40, 41, respectively.

In front of the cavities 40, 41 are now located cavities 51', 52', respectively, filled with a molded green cross which, together with the adjacent flat surface portions of the wall 47 complete and close the cavities 40, 41, respectively. Therefore, only the latter ones are filled with white plastic material, which cannot enter and fill the cavities in body 45 anymore, as it did in the above described starting operation. Furthermore, the hot, plastic, white material ejected into the cavities 40, 41, contacts the solidified green material in the cavities 51' and 52', and combines with the quasi automatically. The heat contained in the plastic white material suffices to replasticize the green material in the cavities 51' and 52', respectively, in contact surface layers, and to cause it to coalesce with the white material just injected into the cavities 40, 41. Again shrinkage of the material injected into cavities 51, 52 and 40, 41 is compensated by pressing additional plastic material into the cavities by the co-ordinated plungers in the way described for the starting operation. After the bodies are sufficiently cooled and thereby solidified, the combination mold is opened again in the way described for the starting operation, and the plungers are withdrawn into their initial position by operating the slide 104.

Now, in the opened mold a compound body is found, like the one shown in Figs. 19, 20. The arms of the cross 2 being inversely V-shaped, as to be seen from Fig. 20, it easily leaves the cavities 51' and 52' when the combination mold is opened, whereas the cylindrical part 1 remains in the cylindrical cavities 40, 41.

The desired compound body is obtained, consisting of a green cross 2 made in the foregoing operation in the cavities 51', 52' as an "initial part," and a white cylindrical plate 1 is added in the second step as a "supplemental part." Furthermore, the two parts have been compounded quasi automatically without using any foreign binding medium and without employing a separate process step for this purpose. Molding of the supplemental part onto and its combination with the initial part have been performed simultaneously.

It is to be understood that I do not want to confine myself to any explanation of the kind of combination taking place between the initial and the supplemental part. Indeed, it may merely be caused for instance by adhesion of the plastic material of the supplemental part to the solidified initial part, or by reheating of superficial portions of the initial part which are contacted by the hot plastic material just injected to form the supplemental part whereby the supplemental and the initial part somewhat coalesce.

I do not exclude from my invention any chemical reaction between the initial and the supplemental parts within the contacting surface portions, aiding or causing the compounding of these parts.

It is further understood that reference to green and white material has only been made for the sake of clearness and simplicity of the description, and that my invention is not limited thereto in any way.

Two compound bodies composed of two parts being completed by two subsequent operation steps forming one cycle, they are now to be taken out of the open combination mold, whereas the green crosses simultaneously molded in the cavities 51, 52 are left therein. Body 45 is turned back into its initial position in which the rear ends of the channels 55', 56' again lie in front of the ends of the injector channels 66, 68, respectively, whereas the rear ends of the channels 57, 58 lie in front of the injector channels 67, 69 and their front ends communicate with the influx passages 42, 43; channels 55, 56 and 57', 58' however are dead. Again the combination mold is closed by means of the handle 33, and injection is started by shifting slide 104. In this third operation the cavities 40, 41 lie in front of the cavities 51, 52 filled with green material during the foregoing second operation, so that in this third operation in which the parts 27, 45 and 60 have the same relative position as during the first operation, the desired compound bodies are obtained consisting in this example of a green cross and a white circular plate. This is due to the fact that cavities 40, 41 are now completed by the green crosses lying in the cavities 51, 52 in front of cavities 40, 41 and by the adjacent front surface portions of wall 47. In this third operation white material is ultimately injected into the cavities 40, 41 and molded into supplemental parts, and simultaneously compounded with the green crosses lying in the cavities 51, 52, whereas new green crosses are molded simultaneously as initial parts in the cavities 51', 52' in the way described for the starting operation.

It is evident that the subsequent fourth, sixth etc. operation will be identical with the second one described above, whereas the subsequent fifth, seventh, etc. operation will be identical with the third one described above. The first operation as described above for the starting operation of the machine is not repeated, excepting for a later new start after an intermission. Two or more subsequent operation steps resulting in a desired compound body form a "cycle." Obviously these cycles are overlapping each other thereby that e. g. in the two step example described above the first step of a subsequent cycle is performed simultaneously with the second step of a foregoing cycle.

There has been described by way of example a combination mold having two cavities in one and four cavities in the other part. It is to be understood however that there may be provided only one cavity in the one part and two cavities in the other one, or the number of cavities may be multiplied above two and four respectively.

It is furthermore obvious that there do not have to be two cavities in the body 45 coordinated to a single cavity in the body 27. The principles of my invention are satisfied by using a single cavity in each of the two bodies 27 and 45, as it may be shown with reference to Figs. 21, 22.

There the body 150, corresponding to body 45 of the other figures is shown in two subsequent operation steps. In the first step the channel 151 lies in alignment with the injector channel 152 and permits plasticized material to enter in the direction of arrow 153 through channel 151, influx passage 154 into the mold cavity 155 closed by the adjacent surface portion 156 of a body 157 which corresponds to body 27 of the other figures. In the second step plastified material may enter in the direction of arrow 158 through channel 159 into channel 160, therein passing through body 150 and entering influx passage 161 and cavity 162 which is completed by the exposed surface of the body still lying in the cavity 155 and made during the first operation step.

The operation cycle being completed therewith, body 157 may be moved in the direction of arrow 163, the mold opened thereby and the compound body removed.

Figure 23:
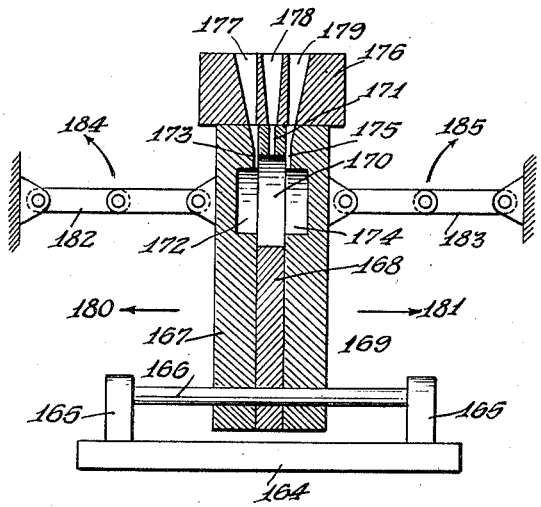
Figure 24:
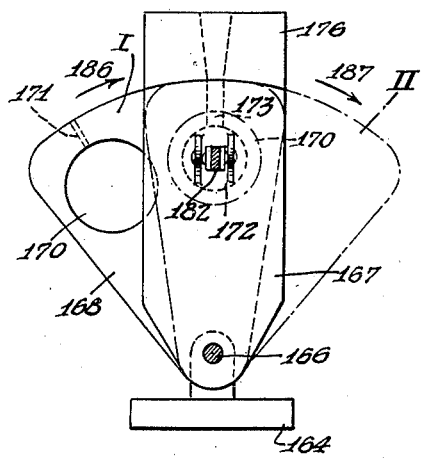

The manufacture of a compound body according to Fig. 2 may be briefly explained on hand of Figs. 23, 24, showing a suitable combination mold in a diagrammatical way only. On a base 164 brackets 165 are secured supporting a bar 166 on which three bodies 167, 168, 169 are slidably and rotatably mounted. Body 168 contains a cavity 170 open on both front sides and connected with an influx channel 171. Body 167 is provided with a cavity 172 and influx passage 173, both opening towards body 168. Body 169 is provided with a cavity 174 and an influx passage 175, both open towards body 168. Another body 176 corresponding to body 60 in other figures is connected with base 164 in a way not shown in the drawings and provided with injector channels 177, 178, 179 to which injector cylinders similar to those shown in other figures may be attached in a suitable way.

Bodies 167, 169 can be rocked around the bar 166 and moved in the direction of the arrows 180, 181 by moving the toggles 182, 183 in the direction of the arrows 184, 185. Body 168 may be turned into the position I, Figure 24, in which the cavity 170 is out of the way between the cavities 172, 174 and substituted by a full portion of body 168, the front surfaces of which lie flush with the inner ones of the bodies 167, 169. Thereby the cavities 172, 174 are closed by the front surfaces of body 168, and identical or different quality plasticized material may be injected for instance simultaneously through channel 177 and passage 173 into cavity 172 and through channel 179 and passage 175 into cavity 174, thereby forming two initial parts. Thereupon body 168 is swung in the direction of arrow 186 into position II, Fig. 24, whereby cavity 170 lies in alignment with cavities 172, 174 and is completed by the exposed surfaces of the initial parts lying in cavities 172, 174 and the adjacent inner front surface portions of bodies 167 and 169, respectively. Now plasticized material can be injected through channels 178, 171 into cavity 170 yielding the supplemental part which coalesces simultaneously with the initial parts lying in the cavities 172, 174. After the compound body thus formed is cooled (conventional cooling may be employed, if desired), the still closed combination mold formed by the bodies 167, 168, 169 is rocked by a few degrees of an angle only, for instance in the direction of arrow 187, whereby the thin strands of material lying in passages 173, 175 and channel 171 is torn off by the cutting action obtained when moving the combination mold relative to the stationary body 176. Thereupon the toggles 182, 183 are broken off by moving them in the direction 184, 185, the mold opened thereby and the compound body lying in cavity 170 can be removed therefrom, simultaneously tearing it off from the material in channel 171, and furthermore tearing off an initial part from the material lying in either passage 173 or 175. The remaining material in channel 171 is then ejected and the combination mold closed for performing a new cycle.

Reverting to the combined mold as exemplified in the drawings, it appears that the compound body will ultimately consist of a circular plate 1, lying for instance in the cavity 40, a thin branch 118 lying in the influx passage 42, and a pin 119 which formerly was lying in the channel 57 or 58 and was removed therefrom by withdrawing the body 27 from the body 45 when opening the combination mold. In order to facilitate such removal the cross channels 57, 58 and consequently the pin 119 are tapered. Furthermore, the compound body comprises a green cross part 2 which is advantageously inversely V-shaped, so that it easily leaves for instance the cavity 51, of a thin branch 116 previously lying in influx passage 53, and of a pin 117 which was previously lying in the tapered passage 55. For the sake of clearness in Figs. 19, 20, branch 116 with pin 117 are shown on one side and branch 118 with pin 119 on the other side of the compound body 1, 2, whereas they lie on the same side of that body if made in the combination mold described above. The passages 42, 53 are V-shaped in order to facilitate the removal of the branches 116 and 118, respectively. From the compound body removed from the cavity 40 the branches 118 and 116 and the pins 119, 117 are to be taken off or cut off, as is well-known to the art and can be done easily and cleanly. Thereby the compound body is finished.

I prefer to also make provision for automatically removing the compound bodies from the cavities 40, 41. To this end a support 120 may be secured to the base 20 by means of screws 121. Ejector needles 122, 123 are secured to the support 120 in front of apertures 124, 125 in the body 27, Figs 4, 5. The needles protrude through the apertures 124, 125 so far that their ends lie flush with the bottom of the cavities 40, 41 when the mold is closed, so that practically no mark remains on the finished body resulting from the provision of my ejecting needles. If the combination mold is opened, however, the body 27 is moved backwards relative to the needles 122, 123 which enter therefore into the cavities 40, 41, and finally eject the compound bodies e. g. into a trough (not shown) which delivers the bodies into a rotating drum in which the branches 116, 118 are broken off and the body is polished, if desired.

From the foregoing it is obvious that one may use my process and the machine described for various purposes. Thus, one may fill all the hoppers 78 to 81 with the same material and manufacture compound bodies completely consisting of the same material. This is particularly advantageous if bodies of a very complicated shape are to be manufactured. This can be considerably facilitated by using a plurality of cavities. By my invention this is combined with the quasi automatic compounding of the several parts made in individual cavities whereby automatically homogeneous compound bodies are obtained in a simple and efficient way, saving a separate compounding step or binding material for connecting the parts. Furthermore, in such a way compound and nevertheless homogeneous bodies may be manufactured of a size by far exceeding that previously obtainable in a single process step with machines and methods known heretofore. It is to be kept in mind that with increasing size also the quantity of material to be used increases, as well as the difficulties of heating and plasticizing it uniformly and fast enough in order to arrive at economical operation conditions. By subdividing large bodies these difficulties are overcome, provided the parts manufactured are combined in such a way as to result in a satisfactorily homogeneous compound bodies also in the places where the parts are connected.

These and other results are obtained by my invention with the additional advantage that molding of a supplemental part and connecting it with an initial part are performed by a single process step. Thereby the heat accumulated in and other properties of the material in its plastic state just undergoing molding into a supplemental part, are used for thoroughly compounding the latter with an initial part.

A mold shown in Fig. 18 which may be inserted in either one of the cavities 40, 41, 51, 52 consists of a body 126 of metal or alloy, for instance iron or steel cast or forged into the shape shown, or into any other desired hollow shape. It may also be obtained by cutting discs from a bar and boring desired hollows into them. The hollow of body 126 is filled with metal or alloy which is not attached chemically or physically by the plasticized material. If the latter consists of acetates, the use of pure nickel, in particular in its chemically pure state, is advisable. Nickel may be cast into the hollow of body 126 or spread into it. Preferably finely divided powdered nickel, obtained for instance by electrolysis is introduced into the hollow body 126 and then pressed therein under hydraulic pressure by means of a die.

The screw 82 may be intermittently turned every time the piston 89 is protruded to inject plastic material. To this end a bar 127 is connected with head 96, Fig. 16, and slidably supported by rolls 128, 129. A pawl 130 is pivotally connected to the bar 127 and pressed by a spring not shown into the ratchet wheel 131 secured to a shaft 132 on which a gear 133 is fastened, meshing with another gear 186 secured on the shaft 83 of the feeding screw 82.

With each injection stroke the pawl 130 rotates the toothed wheel 133 for the length of one tooth of the ratchet wheel 131, while the pawl 130 passes under the wheel 131 during a back stroke without moving it. The rotation of the shaft 132 by wheel 131 is multiplied to any desired degree by the gears 133, 186.

Instead of moving the handles 33, 63 and 105 by hand, a power drive of any conventional type may be used. The handles may also be mechanically coupled with each other, so that they can be actuated with a single means. Simultaneously with moving the slide 104 into its position shown in Fig. 14, turning of body 45 into the next working position and closing of the combination mold 27, 45 may be caused in such a way that body 45 arrives at its new position before the mold is closed, whereas plastified material enters the mold only after it is closed.

In particular power driven means may be provided for operating and controlling the operation of the apparatus described. As shown in Fig. 17, a motor 134 the speed of which may be regulated in any desired way drives a shaft 135 provided with a worm 136 meshing with a gear 137 on a shaft to which a cam 138 is secured. The cam is arranged within a frame 139 slidably supported in brackets 140; when the gear 137 completes one rotation, frame 139 completes a reciprocating movement in the direction of the double arrow 141. The movement of frame 139 may be adjusted in any desired way to properly shaping cam 138. Frame 139 is suitably connected with slide 104 controlling the operation of piston 98. A clutch 142 is provided between shafts 134, 143; to the latter is secured a gear 144 meshing with a toothed circumference provided for this purpose on body 45. Clutch 142 is controlled by a lever 146 ending in the way of slide 104, or a part connected therewith. Therefore slide 104 when moving back into its initial position will actuate the lever 146 and thereby close clutch 142, establishing thereby a connection between shafts 135 and 143 and rotating the body 45 until the clutch 142 is opened again when slide 104 is returned into the position in which piston 98 starts its injection stroke.

Obviously, body 45 is turned while piston 98 is withdrawn and no injection occurs, and the combination mold is open. Body 45 will be turned in this example intermittently in the same direction, and the cross and other channels are to be disposed accordingly.

The fluid pressure in the cylinder 98 acts like an elastic pressure means upon the plungers in the cylinders 71 etc. and the plasticized material fed into the molds. If replacing the drive described by way of example by any other conventional rigid drive such as by crankshafts or cams, it is advisable to arrange e. g. strong helical springs between the drive and the plungers in order to secure the injection of the full quantity of material needed into the molds if the material shrinks when cooled.

It is obvious that a similar power drive as suggested for the injection plungers can be provided for the toggle 23, 224 closing and opening the combination mold, and that such drive can be controlled automatically, for instance in the same way as described for slide 104 in Fig. 17.

For the sake of simplicity and clearness, therefore, this part of the power drive and its automatic control has been omitted from the drawings.

What I claim is:

1. An apparatus for molding under pressure compound bodies of moldable thermoplastic material, comprising two cooperating form members capable of engaging each other with flush lying surfaces in a first and second of two different relative positions, means for temporarily pressing said members against each other in said positions, a mold cavity in each of said members adapted to shape complementary portions of the compound body and opening into said surfaces, a cavity in one of said members facing and being closed by a full surface portion of the other of said members in said first position and facing and being complemented by a cavity in said latter member in said second position, inlet passages in each of said members ending in a cavity thereof, and means for pressing plasticized moldable material through said inlet passages into said closed cavity in said first position and into said complementing cavity in said second position.

2. An apparatus for molding under pressure compound bodies of moldable thermoplastic material, comprising, in combination, a middle form member and two outer members one of which is a form member and the other a feeding member cooperating with said middle member, said middle member being movable relative to said outer members into a first and second of two different relative positions in which said middle member engages said outer members with flush lying surfaces, means for holding said feeding member in engagement with said middle member, means for temporarily pressing said outer form member against said middle member in said positions, a mold cavity in each of said middle and outer form members adapted to shape complementing portions of a compound body and opening into adjacent surfaces of said form members, a cavity in one of said form members facing and being closed by a full surface portion of the other of said form members in said first position and facing and being complemented by a cavity in said other form member in said second position, two feeding channels through said feeding member ending in its surface adjacent said middle member, a feeding passage crossing said middle member, an inlet channel extending from the cavity in said middle member to its surface adjacent said feeding member, an inlet passage leading to the cavity in said outer form member and being open towards the surface of that form member adjacent said middle member, one of said feeding channels registering with said feeding passage and the latter registering with said inlet passage in one of said positions, the other of said feeding channels registering with said inlet channel in the other of said positions, so that plasticized moldable material can be fed through one of said feeding channels to said closed cavity in said first position and through the other of said feeding channels to said complementing cavity in said second position.

3. An apparatus for molding under pressure compound bodies of moldable plastic material, comprising, in combination, a middle form member and two outer members one of which is a form member and the other a feeding member cooperating with said middle member, said middle member being movable relative to said outer members into a first and second of two different relative positions in which said middle member engages said outer members with flush lying surfaces, means for holding said feeding member in engagement with said middle member, means for temporarily pressing said outer form member against said middle member in said positions, a mold cavity in said middle and two mold cavities in said outer form member, said cavities opening into said surfaces, said first mentioned cavity in combination with each of said two cavities adapted to shape complementing portions of a compound body, one of said two cavities facing and being closed by a full surface portion of said middle form member in said first position and facing and being complemented by a cavity in said middle form member in said second position, while the other of said two cavities is arranged to face and to be closed by a full surface portion of said middle form member in said second position and to face and to be complemented by a cavity in said middle form member in said first position, a first, second, third and fourth feeding channel in said feeding member ending in its surface adjacent said middle member, at least one feeding passage crossing said middle member, an inlet channel extending from a cavity in said middle member to its surface adjacent said feeding member, and inlet passages leading individually to the cavities in said outer form member and being open towards the surface of that outer member adjacent said middle member, the first of said feeding channels registering with said feeding passage and the latter registering with one of said inlet passages in one of said positions, the second of said feeding channels registering with said feeding passage and the latter registering with the other of said inlet passages in the other of said positions, the third of said feeding channels registering with said inlet channel in one and the fourth of said feeding channels registering with said inlet channel in the other of said positions, so that plasticized moldable material can be fed through the first of said feeding channels to said closed cavity and through the third of said feeding channels to said complementing cavity in one of said positions and through said second feeding channel to the other closed cavity and through said fourth feeding channel to said complementing cavity in the other of said positions.

4. An apparatus for molding under pressure compound bodies of moldable plastic material, comprising, in combination, a middle form member and two outer members one of which is a form member and the other a feeding member cooperating with said middle member, said middle member being rotatable relative to said outer members into a first and second of two different relative positions in which said middle member engages said outer members with flush lying surfaces, means for holding said feeding member in engagement with said middle member, means for pressing said outer form member against said middle member in said positions and moving it into a position distant from said latter member, a mold cavity each in said middle and outer form members adapted to shape complementing portions of the compound body and opening into adjacent surfaces of said form members, the cavity in said outer form member facing and being closed by a full surface portion of said middle member in said first position and facing and being complemented by the cavity in said middle member in said second position, two feeding channels in said feeding member ending in its surface adjacent said middle member, a feeding passage crossing said middle member, an inlet channel extending from said cavity in said middle member to its surface adjacent said feeding member, an inlet passage leading to the cavity in said outer form member and being open towards the surface of that outer member adjacent said middle member, one of said feeding channels registering with said feeding passage and the latter registering with said inlet passage in said first position and the other of said feeding channels registering with said inlet channel in said second position, so that plasticized moldable material can be fed through one of said feeding channels to said closed cavity in said first position and through the other of said feeding channels to said complementing cavity in said second position; a hole in said outer form member extending from its cavity to its outside, and pin-like ejector means mounted outside said latter form member in alignment with and capable of entering said hole, so that said ejector means enters the cavity in said outer form member when the latter is moved into said distant position.

LEO NAST.